Nov. 29, 1938.  E. S. HILTON  2,138,475
MACHINE FOR ASSORTING ARTICLES ACCORDING TO THEIR WEIGHT
Filed June 10, 1936  7 Sheets-Sheet 2

Inventor:
Everett S. Hilton
by Emery, Booth, Townsend, Miller & Treitler
Attys.

Nov. 29, 1938.　　　　E. S. HILTON　　　　2,138,475
MACHINE FOR ASSORTING ARTICLES ACCORDING TO THEIR WEIGHT
Filed June 10, 1936　　　7 Sheets-Sheet 3

Inventor:
Everett S. Hilton,
by Emery, Booth, Townsend, Miller & Neidner
Attys.

Nov. 29, 1938.  E. S. HILTON  2,138,475
MACHINE FOR ASSORTING ARTICLES ACCORDING TO THEIR WEIGHT
Filed June 10, 1936  7 Sheets—Sheet 5

Nov. 29, 1938.   E. S. HILTON   2,138,475
MACHINE FOR ASSORTING ARTICLES ACCORDING TO THEIR WEIGHT
Filed June 10, 1936   7 Sheets-Sheet 7

Inventor:
Everett S. Hilton
by Emery, Booth, Townsend, Miller & Weidner
Attys.

UNITED STATES PATENT OFFICE 2,138,475

MACHINE FOR ASSORTING ARTICLES ACCORDING TO THEIR WEIGHT

Everett S. Hilton, Belmont, Mass., assignor of one-fourth to Perley A. Brewer and one-fourth to George H. Powers, both of Belmont, Mass.

Application June 10, 1936, Serial No. 84,447

8 Claims. (Cl. 209—121)

This invention relates to a machine for assorting articles such as eggs according to their weights. The machine comprises one or more scales, the number depending upon the desired speed of handling of the eggs. In the present example, several scales are employed, but the principle of operation is in no way dependent upon the number.

The scales are carried by an appropriate conveyor which carries each scale, first to a receiving or loading point at which an egg is deposited upon the scale, and then past a plurality of discharging points at which the discharge is accomplished by selective trippers differentially arranged to cause the discharge of the respective eggs in accordance with their weights into receptacles from which they pass to suitable conveyors leading to other receptacles.

In the present example, the conveyor moves the scales in a closed path, herein a circle. This arrangement is preferred because of its ability to handle a large number of eggs in a given space of time, and because it is compact.

To promote speed in handling, the loading of the scales is accomplished automatically from a hopper under the control of the scale conveyor.

The invention will best be understood by reference to the following detailed description of one specific machine embodying the invention, while its scope will be pointed out more particularly in the appended claims.

Referring to the drawings and to the embodiment of the invention illustrated therein by way of example, there is shown a machine comprising a plurality of scales, all identical in construction, one of which is illustrated in Figs. 11 to 14 inclusive. The scale or weighing mechanism comprises a support of fixed height, which, in the present example consists of a pair of spaced, vertical standards 20 suitably secured as by screws 22 to an appropriate conveyor 24 hereinafter described The scale comprises a platform or pan 26 supported on the standards by mechanism now to be described, which normally maintains the platform or pan horizontal while permitting it to move vertically. This is conveniently accomplished by a parallel motion mechanism which is essentially the same as those commonly used for many years in scales for weighing photographic chemicals, the same comprising a linkage composed of a vertical link 28 and upper and lower links 30 and 32 connecting the vertical link 28 to the vertical standards 20. The links 30 and 32 are supported on the standards 20 by pivots 34 and 36, respectively, and to the vertical link 28 by pivots 38 and 40, respectively. The weight of the pan, the linkage and other parts sustained by the latter is neutralized by a counterbalance, herein a weight 42 mounted on an arm 44 which is conveniently a prolongation of the link 30. No other weight is needed.

Figure 12:
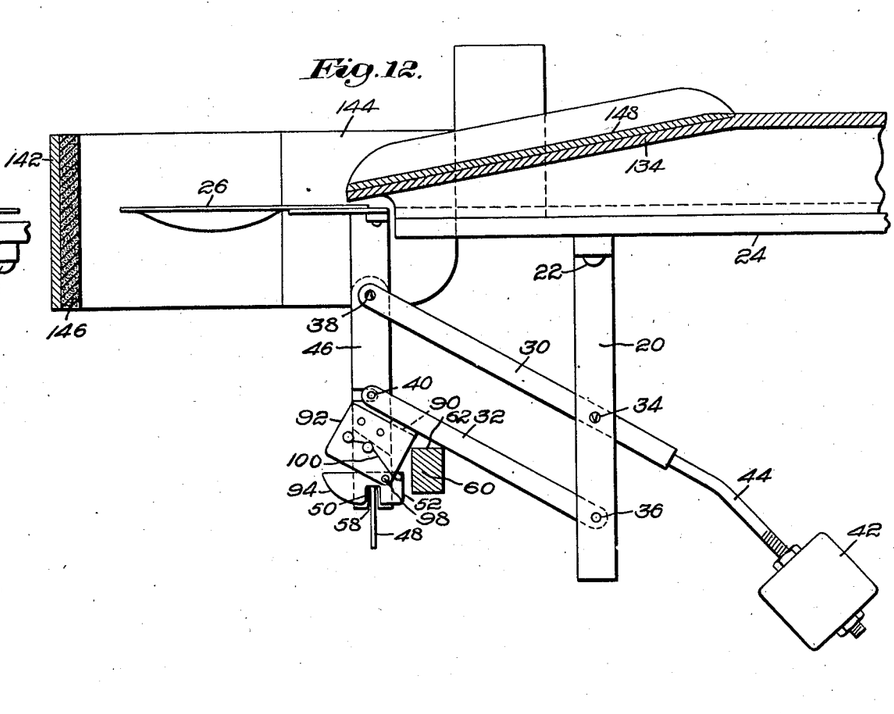
Fig. 12 is a side elevation of the same.

The platform or pan is supported on the parallel motion by novel means, now to be described, which normally locks the platform or pan but which can be unlocked by a tripper, whereupon the loaded platform or pan tilts and assumes a sloping position to discharge the egg. To this end the platform or pan is rigidly secured to the upper end of a lever 46 which is fulcrumed on the pivot 38 and normally occupies a vertical position alongside the vertical link 28 as shown in Fig. 12. The lever is normally locked in this position by locking mechanism now to be described.

A locking dog 48 is supported on the vertical link 28 in such a manner that it is freely pendant and is normally received in a notch 50 in a locking plate 52 carried by the lever 46. To this end, the locking dog is mounted on a pivot 54 in a slotted or bifurcated stud 56 rigidly affixed to the vertical link 28. The center of gravity of the locking dog 48, i. e. the distribution of its mass with reference to the pivot 54 on which it is hung is such that the dog always tends to assume the position illustrated in Figs. 11 and 12. To resist tendency of the dog to bend or to cramp when a thrust is imposed on its lower end in a direction perpendicular to its plane, the dog is normally received in a notch 58 in the lower end of the link 28.

Thus it is apparent that when an egg is deposited upon the platform or pan, the latter cannot tilt until the locking dog is withdrawn from its interlocking engagement with the vertical link 28 by engagement with one of a series of trippers presently to be described.

When an egg is deposited upon the platform or pan, the weight of the egg overcomes the neutralizing effect of the counterbalance 42 and the pan tends to descend but without tilting, the depth to which it will descend being, of course, dependent upon the weight of the egg.

As will presently appear, the scales are caused to travel horizontally past a loading point and thence past a plurality of unloading points. To prevent the scale pan from descending suddenly and perhaps accidentally discharging the egg, I have provided appropriate means to prevent immediate descent of the loaded pan and to allow the latter to descend gradually as the scale is moved horizontally by the conveyor. To this end, I have provided at the loading point (see Figs. 5 and 9) a track 60 having a high point 62, which, by engagement with the under side of the lower link 32 prevents descent of the pan, but when the scale travels horizontally toward the right, as viewed in Fig. 5, the link is allowed to descend by a downwardly sloping portion 64 of the track.

In the example shown, the nature of the conveyor is such that the scales travel in a closed path, herein a circle, the conveyor, to this end, being a turret rotating about a vertical axis. Accordingly, as the turret rotates, each scale will travel past a plurality of unloading points and will return to the loading point from the left, as viewed in Fig. 5. After the egg is unloaded at one of the unloading points, as presently described, the pan will immediately rise under the influence of the counterbalance 42 but as a matter of precaution, the track 60 has a portion 66 which slopes upwardly from the left to the high point 62, as viewed in Fig. 5, to insure restoration of the scale to its normal elevated position to receive another egg at the loading point.

In the present embodiment, there are four unloading points (see Fig. 9) at which there are receptacles 68, 70, 72 and 74 each corresponding to and intended to receive an egg of a certain weight, the first one, 68, being intended to receive the heaviest egg, and so on through the series. There is also an emergency receptacle 76 to receive an egg which perchance might accidentally be discharged from the pan before reaching the container 68.

Figures 9, 10, 10A:
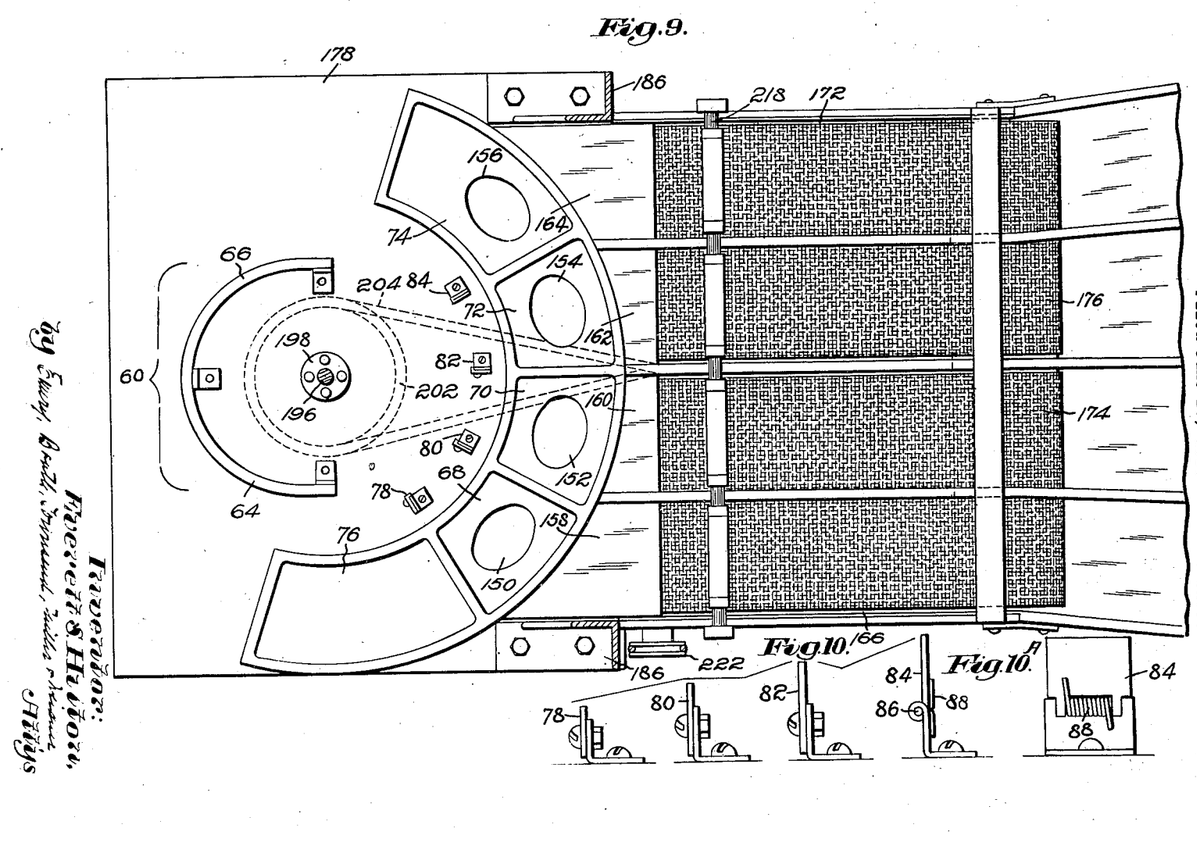
Fig. 9 is a horizontal sectional view on line 9—9 of Fig. 2.
Fig. 10 is a development illustrating the selective scale discharging tripper.
Fig. 10a is a rear elevation of the final tripper.
Figure 11:
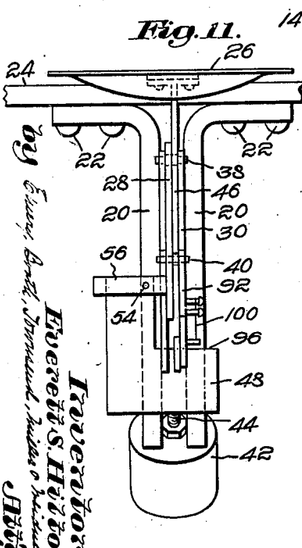
Fig. 11 is a front elevation of one of the scales empty and in its elevated position.

The means for the selective tripping of the scales and the unloading of the eggs into the proper receptacles will now be described reference being had to Fig. 10 which shows a horizontal series of trippers 78, 80, 82 and 84 of progressively increasing heights, and associated with the receptacles 68, 70, 72 and 74, respectively. The first one, 78, is the lowest and will trip the heaviest loaded scale, as for example, one carrying an egg of twenty-four ounces per dozen, the second to trip a scale carrying an egg of 23 ounces per dozen the third to trip a scale carrying an egg of twenty-two ounces per dozen, and the fourth to trip a scale carrying an egg weighing from twenty ounces per dozen down to sixteen ounces per dozen. As a safety measure, the tripper 84, instead of being rigid, as is the case with the others, is mounted on a pivot, and a suitably arranged spring 88 normally holds the tripper upright but will yield and prevent possible injury to the locking dog 48 and yet will unlock the latter.

Figures 13, 14:
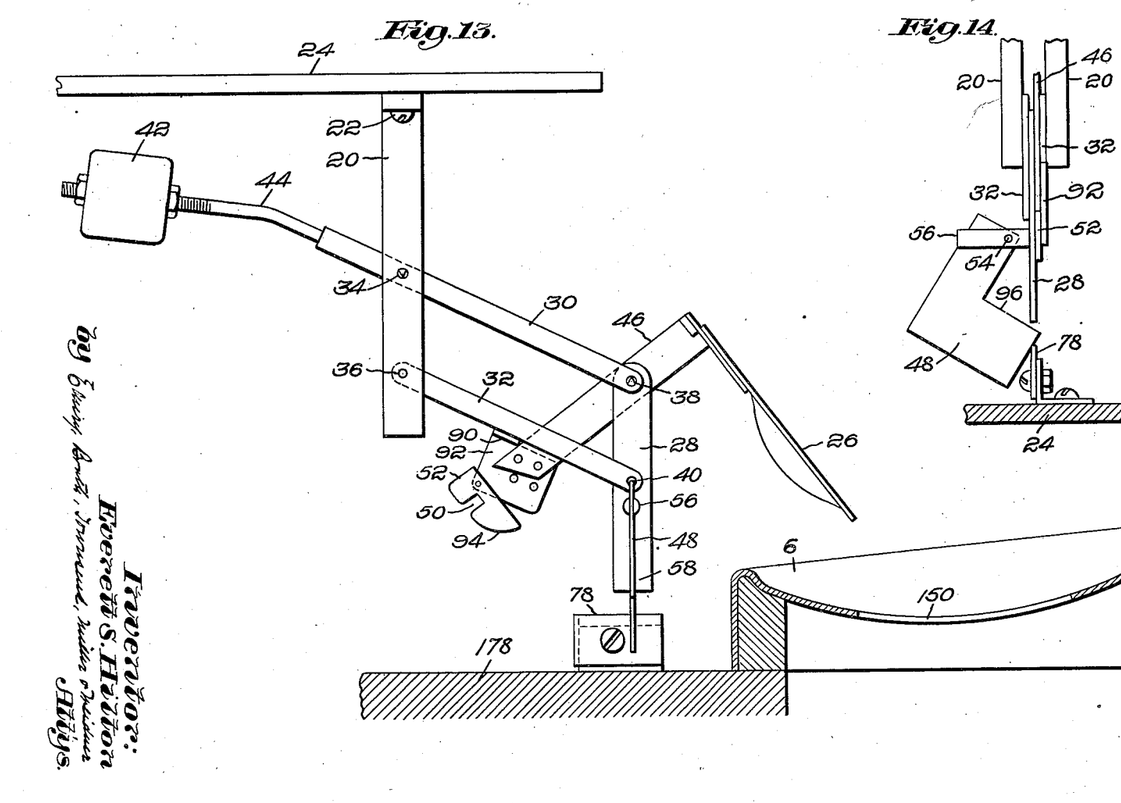
Fig. 13 is a side elevation of the scale after it has been tripped to discharge the egg.
Fig. 14 is a front elevation of a portion of the parts shown in Fig. 13.

The actuation of the locking dog to unlock the scale and to allow the pan to tilt and to unload the egg into a given receptacle will now be described, reference being had to Figs. 13 and 14 which show the heaviest loaded scale being unloaded by the lowest tripper 78. Fig. 13 shows the locking dog 48 in engagement with the tripper 78 and swung rearwardly so that is withdrawn from the notches 50 and 58. Accordingly, the lever 46 has been released and the weight of the egg has swung the pan and the lever into the position shown in Fig. 13 and the egg has been discharged into the receptacle 68.

The ascent of the scale mechanism is limited by a stop 90 carried by the lever 46 and engaging the under side of the lower link 32, said stop herein being formed on a plate 92 fixedly secured to and forming in effect a part of the lever.

The restoration of the weighing mechanism to its normal elevated position will now take place under the influence of the counterbalance 42, assisted if necessary, by the upward slope 66 of the track 60. As the locking plate 52 encounters the dog 48, a sloping surface 94 formed on the plate will ride over the upper edge 96 of the locking dog 48, thus momentarily lifting the dog and the latter will enter the notches 50 and 58. If for any reason the dog should stick and fail to rise, a safety provision prevents injury to the mechanism. To this end, the locking plate 52 instead of being rigidly affixed to or a part of the lever 46 is mounted on a pivot 98 on the lever, and a suitably arranged spring 100 yields and allows the plate 52 to swing on the pivot as the sloping surface 94 of the plate rides over the upper edge 96 of the dog. As soon as the dog locks the lever, the weighing mechanism is in readiness to receive another egg at the loading point.

Loading is accomplished rapidly and automatically from a hopper 102 (see Fig. 1) having a bottom which slopes downwardly, and the eggs are urged along by a belt 104 into a channel 106 from which they are released one by one automatically by a swinging gate 108 mounted on a rock-shaft 110, and interconnected by a crank 112 and a link 114 (see Fig. 7) with a lever 116 having an arm 118 which is raised into the path of the next succeeding egg as the gate is opened. The actuation of the arm 118 and the gate 108 is conveniently accomplished in properly timed relation to the rotation of the rotating turret 24 by providing the latter with a succession of lugs 120 which (see Fig. 3) successively engage and lift an arm 122 secured to a rockshaft 124 to which the lever 116 is secured. Restoration of the rock-shaft and connected parts to their normal position is accomplished as by a second arm 126 herein a part of the arm 122 and urged toward the side of the channel 106 by a spring 128. Motion of the connected parts in the opposite direction is conveniently limited by an arm 130 secured to the rock-shaft 124 and engaging a fixed stop 132.

When the egg is released by the opening of the gate it is allowed to gravitate to the pan of one of the series of scales carried by the rotating turret 24, the latter to this end being provided with a series of downwardly inclined chutes 134 (see Fig. 6) which successively pass a fixed chute 136 beneath and leading downwardly from the gate 108. In the present example, the rotation of the turret 24 is continuous, and so, to insure the passage of the egg from the gate into the proper chute 134 as the latter comes into registration with the fixed chute. I have made certain safety provisions which will now be described.

Figure 1:
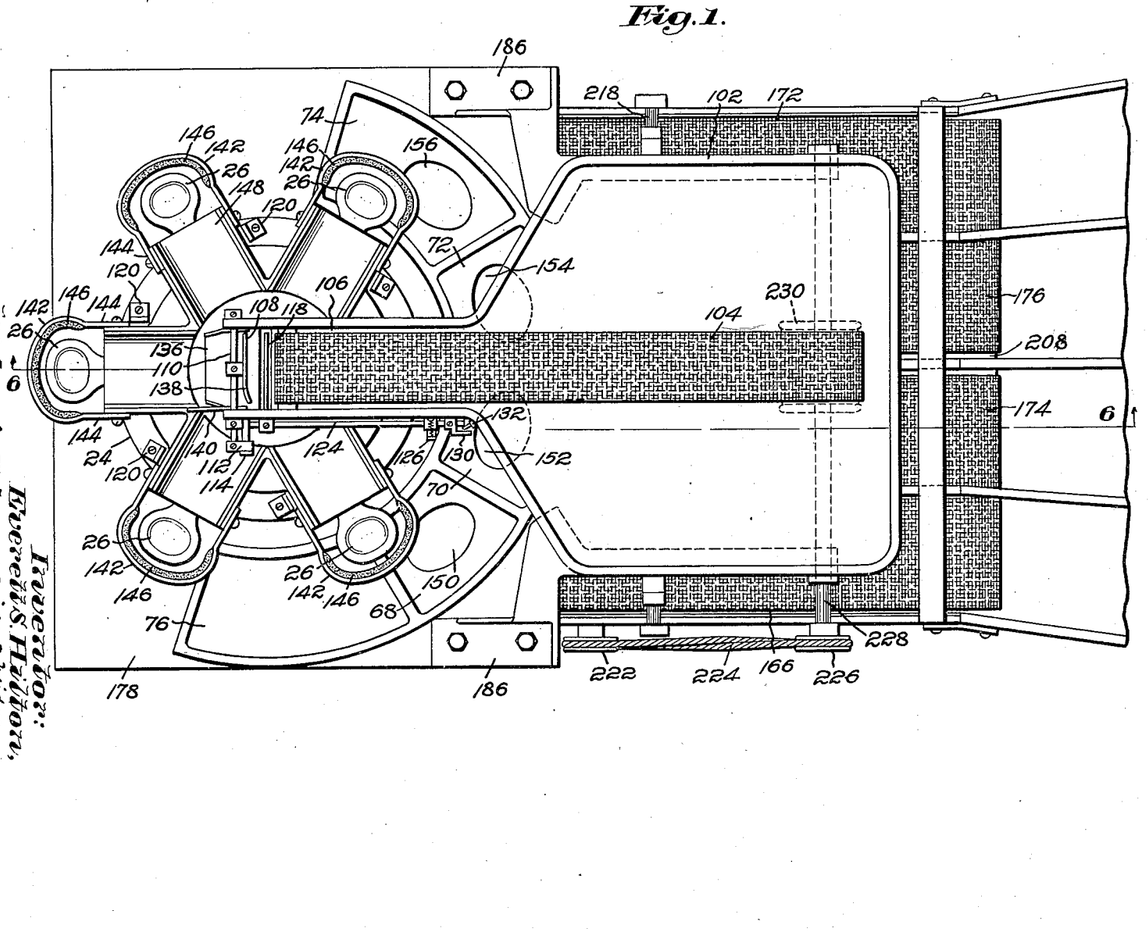
Fig. 1 is a plan of a machine embodying the invention.
Figures 2, 3, 4:
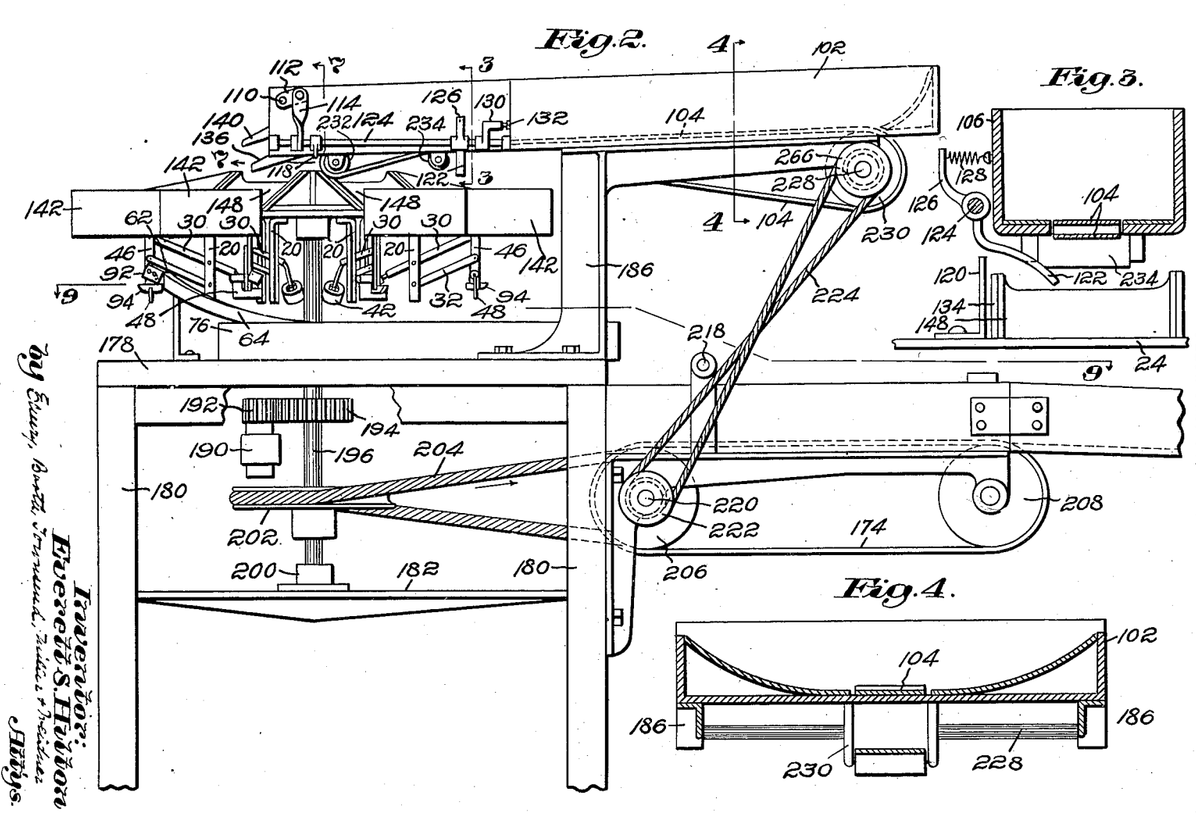
Fig. 2 is a side elevation of the same.
Fig. 3 is a sectional view on line 3—3 of Fig. 2.
Fig. 4 is a sectional view on line 4—4 of Fig. 2.

Referring to Fig. 1, the gate 108 is provided with an inclined portion 138 which is sloped toward the rear edge of the chute 134, considered with reference to the direction of movement of the latter past the fixed chute 136. When, therefore, the gate is opened, its inclined portion 138 tends to cause the egg to roll toward the rear edge of the chute 134 which is coming into alignment with the fixed chute 136. As a further precaution, I have provided a guard 140 mounted in fixed position alongside and above the fixed chute 136 and projecting out over the forward edge of the moving chute 134 to avoid the possibility of the egg rolling into the next preceding, moving chute.

When the egg rolls down the moving chute 134 onto the pan, in spite of the concavity of the latter, the egg would be apt to roll off the pan, and to prevent this, I have provided a guard 142 of generally U-shaped form disposed about the pan and having its arms 144 affixed to the sides of the chute 134. Each chute is so equipped. This guard is cushioned with a strip 146 of cushioning material, such as felt, the chute 134 is lined with cushioning material 148, such as rubber, and other cushioning material may be used wherever needed.

Reverting now to the receptacles 68, 70, 72 and 74 (see Fig. 9) into which eggs are selectively deposited, as hereinbefore described, these receptacles are provided with exit orifices 150, 152, 154 and 156 through which the eggs gravitate onto downwardly inclined chutes 158, 160, 162 and 164 into channels 166, 168, 170 and 172. Beneath these channels are two moving belts 174 and 176, the belt 174 serving the channels 166 and 168 and the belt 176 serving the channels 170 and 172, and acting to carry the eggs toward exits where they may be collected in appropriate receptacles.

The machine is provided with an appropriate framework (see Fig. 5) comprising a table 178, legs 180, and horizontal braces 182 and 184. Legs 186 support the hopper and associated parts on the table 178, and the latter supports the track 60, the receptacles 68, 70, 72, 74 and 76, and the trippers 78, 80, 82 and 84.

Figure 5:
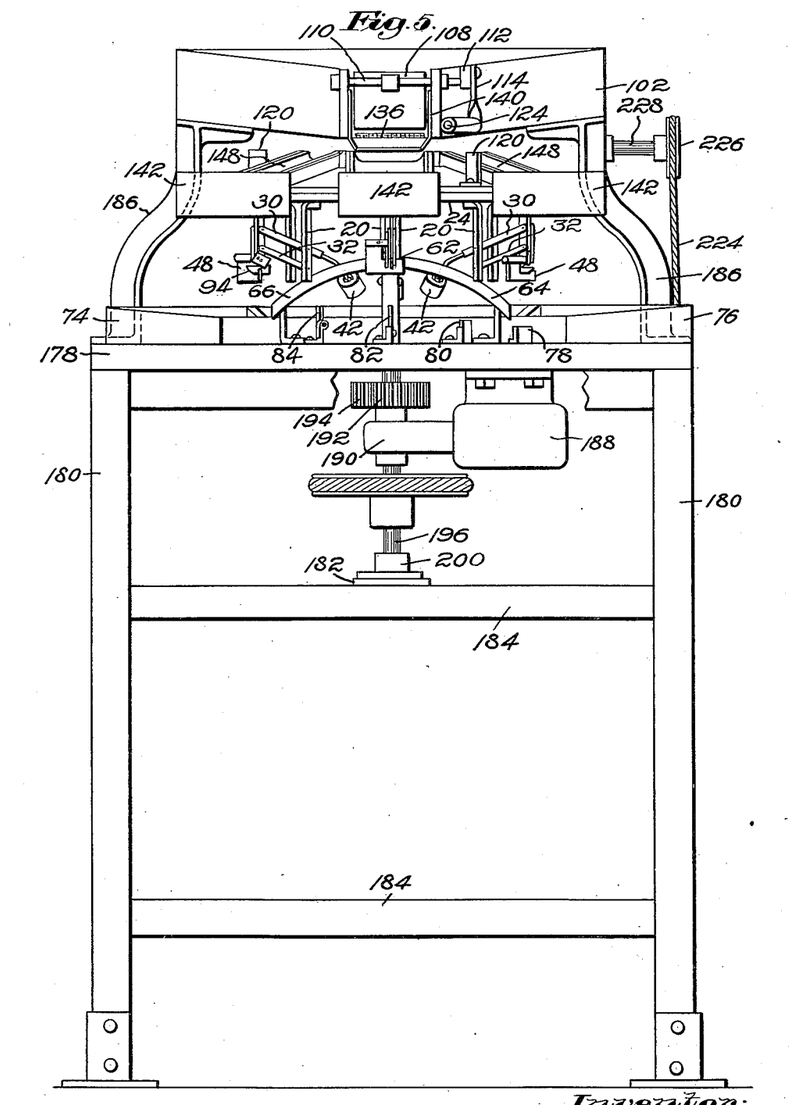
Fig. 5 is a front elevation of the machine.

The mechanism for driving the various moving parts will now be described, reference being had at first to Fig. 5. Power is supplied by a motor 188 having an extension housing 190 containing a reduction gear-set (not shown) which in turn is connected by a pinion 192 and a gear 194 to a vertical shaft 196 to which the turret 24 is secured. This shaft is mounted in upper and lower bearings 198 and 200 supported by the table 178 and the brace 182, respectively.

Figures 6, 7, 8:
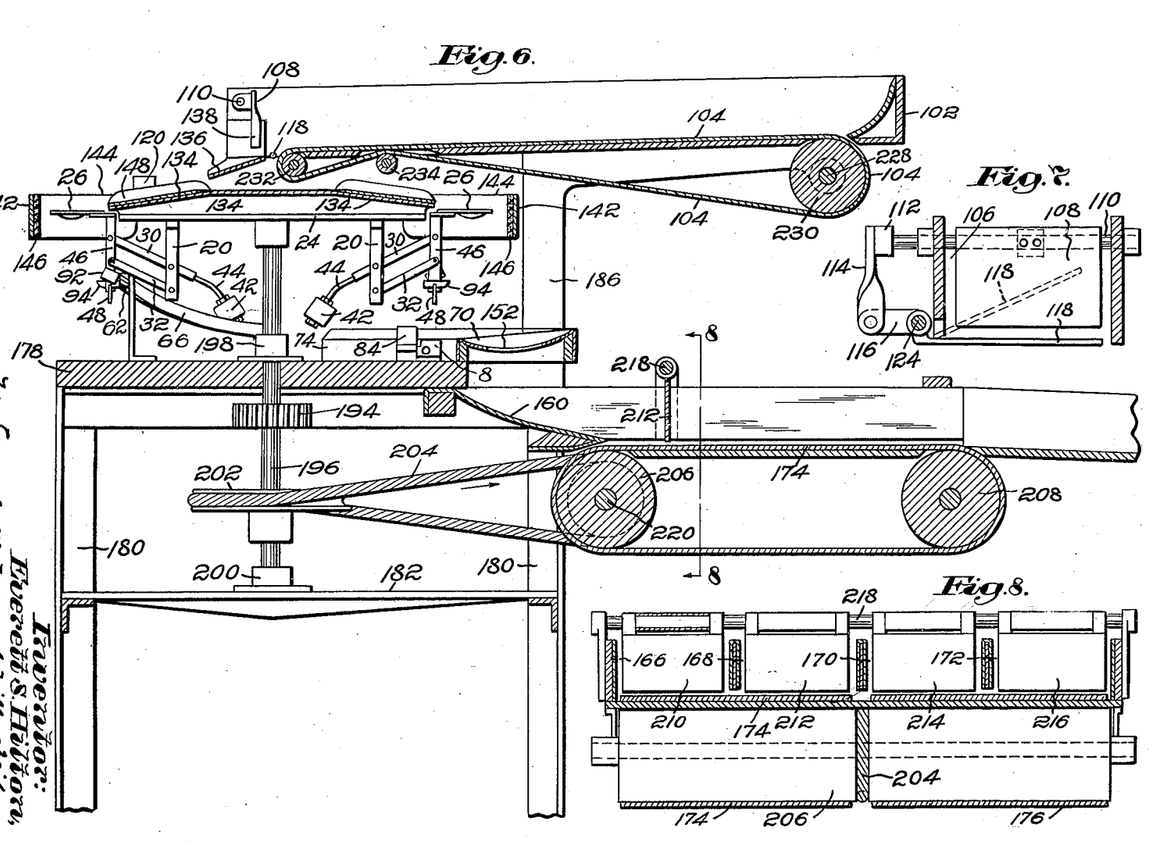
Fig. 6 is a vertical sectional view on line 6—6 of Fig. 1.
Fig. 7 is a sectional view on line 7—7 of Fig. 2.
Fig. 8 is a sectional view on line 8—8 of Fig. 6.

Referring now to Fig. 6, a pulley 202 secured to the shaft 196 is connected by a quarter turn belt 204 to the center of a pulley 206 (see Fig. 8) which is in the nature of a long drum for driving the belts 174 and 176 which belts pass over an idler drum 208. As the eggs descend upon the belts 174 and 176 they are checked by freely swinging flaps 210, 212, 214 and 216 hung upon a pivot rod 218.

The drum 206 is secured to a shaft 220 to which (see Fig. 1) there is also secured a pulley 222 connected by a crossed belt 224 to a pulley 226, the latter being secured to a shaft 228 to which is also secured a pulley 230 to drive the belt 104. The latter (see Fig. 6) also passes over idler pulleys or rollers 232 and 234, and its upper lead is supported by a plate 236.

The general operation of the machine should be so clear from the foregoing that a further description is deemed unnecessary.

Having thus described one embodiment of the invention, but without limiting myself thereto, what I claim, and desire by Letters Patent to secure is:

1. In a machine for assorting articles in accordance with their weights, the combination of a horizontally rotating turret having on its top a series of chutes which are inclined downwardly and outwardly with relation to the center of rotation of said turret, a hopper having an outlet, means to cause the release of articles one by one from said outlet to said chutes, respectively, a series of scales beneath and carried by said turret and having weighing pans successively receiving articles gravitating therefrom from said chutes respectively, a series of receptacles beneath the path in which said pans travel, and a series of selective scale trippers associated with said receptacles, respectively, and arranged selectively to trip said scales and to discharge articles from said pans according to the weights of said articles.

2. In a machine for assorting articles in accordance with their weights, the combination of a hopper having an outlet, means to cause the release of articles one by one from said hopper, a horizontally rotating turret beneath said hopper and provided with a series of downwardly inclined chutes which successively receive articles from said hopper and which discharge the articles radially outward with relation to the center of rotation of said turret, a series of scales associated with said chutes, respectively, and mounted beneath and carried by said turret, each having a weighing pan into which an article gravitates from one of said chutes, a series of receptacles beneath the path in which said scales travel, and a series of selective scale trippers associated with said receptacles, respectively, and arranged selectively to trip said scales and to discharge articles from said pans according to the weights of said articles.

3. In a machine for assorting articles in accordance with their weights, the combination of a horizontally rotating turret having a series of generally radial chutes, means to deliver articles one by one to the inner ends of said chutes, a series of scales carried by said turret and having weighing pans adjacent the outer ends of said chutes, respectively, to receive articles from said chutes, a series of receptacles below said turret, and means selectively to trip said scales and to cause said pans to discharge the articles into said receptacles in accordance with the weights of said articles.

4. In a machine for assorting articles in accordance with their weights, the combination of a horizontally rotating turret having a series of generally radial chutes, means to deliver articles one by one to the inner ends of said chutes, a series of scales carried by said turret and having weighing pans adjacent the outer ends of said chutes, respectively, to receive articles from said chutes, guards about said pans, respectively, a series of receptacles below said turret, and means selectively to trip said scales and to cause said pans to discharge the articles into said receptacles in accordance with the weights of said articles.

5. In a machine for assorting articles in accordance with their weights, the combination of a hopper having an outlet channel, a conveyor belt at the bottom of said hopper to convey articles from said hopper through said channel, a gate controlling the exit of articles from said channel, a stop rearwardly of said gate to arrest the next succeeding article, means to operate said gate and said stop in succession to cause articles to be passed one by one from said channel, a downwardly inclined chute leading from said channel, a horizontally rotating turret beneath said chute and provided with a series of downwardly inclined chutes which are brought successively into alignment with the first-mentioned chute to receive articles therefrom, a series of scales associated with said series of chutes, respectively, and mounted beneath and carried by said turret, each scale having a weighing pan, a series of guards about said pans, respectively, and carried by said turret, a series of receptacles beneath the path in which said scales travel, a series of selective, scale trippers associated with said receptacles, respectively, and arranged selectively to trip said scales and to discharge articles from said pans according to the weights of said articles, a series of channels leading from said receptacles, respectively, and conveyor belts associated with the last-mentioned channels to convey the articles along the same, in a direction opposite to their travel from said hopper along the first-mentioned channel and along said downwardly inclined chutes to said pans.

6. In a weighing and dumping mechanism for use in a machine for assorting articles in accordance with their weights, the combination of a standard, a linkage comprising a vertical link and upper and lower links disposed between and connecting said vertical link to said standard to maintain said vertical link in parallelism with said standard as said vertical link moves vertically, a weighing pan, a pan supporting lever fulcrumed on said linkage and normally disposed in a position in which said pan is horizontal, said lever being arranged to swing on its fulcrum to tilt said pan to discharge its contents, and locking means normally to lock said lever in such position, said locking means comprising a locking plate and a locking dog, said plate being provided with an opening and a sloping surface to cause said dog to recede relatively to said plate as said dog approaches a position of registry with said opening, said plate being pivotally connected with said lever so that said plate will swing and recede relatively to said dog as the latter rides along said surface if said dog should fail to recede relatively to said plate as said dog approaches a position of registry with said opening.

7. In a weighing and dumping mechanism for use in a machine for assorting articles in accordance with their weights, the combination of a horizontally movable conveyor, a standard carried by said conveyor, a linkage comprising a vertical link and upper and lower links connecting said vertical link to said standard, a lever fulcrumed on said vertical link, a pan supported by said vertical link above and at one side of the fulcrum of said lever and, when loaded, tending to tilt said lever on its fulcrum, a counterbalance normally neutralizing the weight of said pan and said linkage and tending to elevate the same, means to limit the elevation of said pan and said linkage under the influence of said counterbalance, and to limit the tilting of said lever under the influence of a load on said pan, a pivoted locking plate carried by said lever, a locking dog pivoted on said vertical link and normally interlocked with said locking plate and preventing the tilting of said lever under the influence of a load on said pan, the center of gravity of said locking dog being such that said dog normally tends to remain interlocked with said plate, means to prevent immediate descent of said pan and said linkage under the influence of a load on said pan and arranged to lower the same gradually as said conveyor travels horizontally, a tripper which is engaged by said locking dog during horizontal travel of said conveyor, and which tripper causes said dog to swing and to become disengaged from said locking plate, said locking plate being provided with a sloping surface which, after discharge of the load and during ascent of said pan and said linkage, causes said plate to be interlocked again with said plate and to prevent tilting of said lever, and a spring connected to said plate and arranged to allow said plate to swing on its pivot as said sloping surface rides over said dog.

8. In a weighing and dumping mechanism for use in a machine for assorting articles in accordance with their weights, the combination of a horizontally movable conveyor, a standard carried by said conveyor, a linkage comprising a vertical link and upper and lower links connecting said vertical link to said standard, a lever fulcrumed on said vertical link, a pan supported by said vertical link above and at one side of the fulcrum of said lever and, when loaded, tending to tilt said lever on its fulcrum, a counterbalance normally neutralizing the weight of said pan and said linkage and tending to elevate the same, means to limit the elevation of said pan and said linkage under the influence of said counterbalance, and to limit the tilting of said lever under the influence of a load on said pan, a pivoted locking plate carried by said lever, a locking dog pivoted on said vertical link and normally interlocked with said locking plate and preventing the tilting of said lever under the influence of a load on said pan, the center of gravity of said locking dog being such that said dog normally tends to remain interlocked with said plate, a tripper which is engaged by said locking dog during horizontal travel of said conveyor, and which tripper causes said dog to swing and to become disengaged from said locking plate, said locking plate being provided with a sloping surface which, after discharge of the load and during ascent of said pan and said linkage, causes said plate to be interlocked again with said dog and to prevent tilting of said lever, and a spring connected to said plate and arranged to allow said plate to swing on its pivot as said sloping surface rides over said dog.

EVERETT S. HILTON.